US009803523B2

(12) United States Patent
Hagg et al.

(10) Patent No.: US 9,803,523 B2
(45) Date of Patent: Oct. 31, 2017

(54) PROCESS FOR AXIAL SKINNING APPARATUS

(71) Applicant: Corning Incorporated, Corning, NY (US)

(72) Inventors: Ralph Henry Hagg, Corning, NY (US); Parasuram Padmanabhan Harihara, Painted Post, NY (US); John Paul Bir Singh, Painted Post, NY (US); Srinivasa Rao Vaddiraju, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 415 days.

(21) Appl. No.: 14/514,947

(22) Filed: Oct. 15, 2014

(65) Prior Publication Data

US 2015/0105896 A1 Apr. 16, 2015

Related U.S. Application Data

(60) Provisional application No. 61/891,147, filed on Oct. 15, 2013.

(51) Int. Cl.
*G05B 15/02* (2006.01)
*F01N 3/022* (2006.01)
(Continued)

(52) U.S. Cl.
CPC ............ *F01N 3/0222* (2013.01); *B05C 5/027* (2013.01); *B28B 19/0038* (2013.01);
(Continued)

(58) Field of Classification Search
CPC . F01N 3/0222; B29C 47/0028; B29C 47/027; B29C 47/028; B29C 47/92; B28B 19/0038; C04B 41/85
See application file for complete search history.

(56) References Cited

U.S. PATENT DOCUMENTS 2,820,249 A * 1/1958 Colombo ............... B05C 5/0241
118/302
3,957,940 A * 5/1976 Schubert ................... B05C 9/04
156/196
6,660,086 B1 * 12/2003 Prince ...................... B05C 3/005
118/125

OTHER PUBLICATIONS

Lanteri et al., "Rheological behaviour of a polymer-ceramic blend used for injection moulding", 1996 Chapman & Hall.*
(Continued)

*Primary Examiner* — Carlos Ortiz Rodriguez
(74) *Attorney, Agent, or Firm* — John L. Haack

(57) ABSTRACT

A process for operating an axial skinning apparatus for continuous manufacture of skinned ceramic honeycomb parts, including:
  determining the physical process parameters of the apparatus including:
    the rheology of the flowable skin cement;
    the geometry of the part to be skinned; and
    the geometry of the annulus gap of the skinning chamber; and
  calculating a plurality of dimensionless pressure gradient values (Lambda ($\Lambda$)) according to the formula (1):

$$\Lambda = \frac{(\Delta P)R}{2mL}\left(\frac{R}{V}\right)^n \qquad (1)$$

where $\Delta P$, P, R, V, L, and m and n are as defined herein;
plotting a plurality of manifold pressures versus a plurality of part velocities; and
selecting at least one operating window based on the skin quality of a plurality of preliminarily skinned parts.

9 Claims, 5 Drawing Sheets

(51) Int. Cl.
*B05C 5/02* (2006.01)
*H01B 13/16* (2006.01)
*C04B 41/85* (2006.01)
*B28B 19/00* (2006.01)
*B29C 47/00* (2006.01)
*B29C 47/02* (2006.01)
*B29C 47/92* (2006.01)

(52) U.S. Cl.
CPC ........ *B29C 47/0028* (2013.01); *B29C 47/027* (2013.01); *B29C 47/028* (2013.01); *B29C 47/92* (2013.01); *C04B 41/85* (2013.01); *G05B 15/02* (2013.01); *H01B 13/16* (2013.01)

(56) References Cited

OTHER PUBLICATIONS

Rothstein et al., "The axisymmetric contraction-expansion: the role of extensional rheology on vortex growth dynamics and the enhanced pressure drop", 2001 Elsevier Science B.V.*

Chien et al., "Study on rheological behavior of polymer melt flowing through micro-channels considering the wall-slip effect", 2005 IOP Publishing Ltd.*

Rajeev Malik and Uday V. Shenoy, "Generalized Annular Couette Flow of a Power-Law Fluid", Ind. Eng. Chem. Res., vol. 30, No. 8, 1991, pp. 1950-1954.

* cited by examiner

PROCESS FOR AXIAL SKINNING APPARATUS

This application claims the benefit of priority under 35 U.S.C. §119 of U.S. Provisional Application Ser. No. 61/891,147 filed on Oct. 15, 2013, the content of which is relied upon and incorporated herein by reference in its entirety.

CROSS-REFERENCE TO RELATED APPLICATIONS

This application is related to commonly owned and assigned copending patent Provisional Application Ser. No. 61/564,395, filed Nov. 29, 2011, now U.S. patent application Ser. No. 13/463,125, filed May 3, 2012, entitled "APPARATUS AND METHOD FOR SKINNING ARTICLES," and Provisional Application Ser. No. 61/828,363, filed May 29, 2013, now PCT Patent application No. PCT/US14/38901, filed May 21, 2014, entitled "METHOD AND SYSTEM FOR CONTROL OF AN AXIAL SKINNING APPARATUS," the content of which is relied upon and incorporated herein by reference in its entirety, but does not claim priority thereto.

The entire disclosure of any publication or patent document mentioned herein is incorporated by reference.

BACKGROUND

The disclosure relates to a method for operating an axial skinning apparatus to achieve a high quality and defect-free skinned ceramic parts.

SUMMARY

In embodiments, the disclosure provides a method for operating an axial skinning apparatus to achieve a high quality and defect-free skinned ceramic parts.

In embodiments, the disclosure provides a process having superior operating conditions and superior skinning results for ceramic parts skinned in an axial skinning apparatus.

In embodiments, the disclosure provides a dimensionless pressure parameter Lambda ($\Lambda$), which relates to various process parameters cement, rheological properties, and the part geometry. As long as the value of the Lambda ($\Lambda$) parameter is closer to a certain value or limit ($\Lambda_{cr}$) and approaching $\Lambda_{cr}$ from below, the operating skinning process will minimize or eliminate ripples on the resulting skinned parts. The Lambda critical value ($\Lambda_{cr}$) depends on the geometry of an apparatus feature, essentially the size of annulus or the gap (k), and the rheology of the flowable cement.

In embodiments, the disclosure provides a procedure to calculate $\Lambda$ and provides a physical basis for $\Lambda$.

In embodiments, the disclosure provides a superior axial skinning process, which process operates as close to the $\Lambda_{cr}$ limit value as possible but without exceeding the $\Lambda_{cr}$ limit value.

In embodiments, the disclosure provides a method for calculating the $\Lambda_{cr}$ limit value and determining a $\Lambda_{cr}$ limit value when the axial skinning process is conducted in different axial skinning apparatus configurations having variations in, for example, article and apparatus dimensions, apparatus operating (i.e., process) parameters, rheology of the flowable cement, or combinations thereof.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus or system, and the disclosed method of using the apparatus for skinning ceramic parts provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Unipipe" refers to a central structure of the apparatus that is adapted to receive an un-skinned ceramic part and further adapted to receive flowable cement from a cement source and to deliver the cement to the surface of the un-skinned part within the unipipe to produce the skinned part.

"Tailpipe" refers to the out bound or exit portion of the unipipe and where the part is bearing skin.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Consisting essentially of" in embodiments can refer to, for example:

a process for operating an axial skinning apparatus as defined and disclosed herein.

The apparatus for making the skinned article, the method of making a skinned article, the resulting skinned article, the compositions, or the formulations, of the disclosure can include the components or steps listed in the claim, plus other components or steps that do not materially affect the basic and novel properties of the compositions, articles, apparatus, or methods of making and use of the disclosure, such as particular compositions, particular additives or ingredients, a particular agent, a particular surface modifier or wetting agent or condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, more specific values, and preferred values described herein.

Corning Incorporated makes substrate and filter articles that are used in heavy duty vehicles for after treatment emission control, and which control satisfies environmental regulations. One of the steps in the production of these heavy duty substrates and filters is the application of a cement based skin or outer wall on the outer peripheral axial surface of the substrates and filters.

The skin on a part, such as ceramic filter article, is the interface between the part and the surroundings. The skin serves several advantageous functions, for example, the skin:

adds to the aesthetics of the part and is valued by customers as an indicator of quality;

protects the part's functional filter portion from structural degradation such as chipping damage, and other hazards surrounding the part, in manufacture and use, such as in handling and transport of the part; and adds to the 'isostatic' strength of the part, which is a significant performance metric for modern parts.

For heavy duty substrates and filters, the skin can be applied during the finishing process. Parts have conventionally been skinned using so-called coat hanger dies. This conventional skinning process has a relatively low material utilization of about 30 to 50%, which can add to the operating and manufacturing costs of the part. The conventional skinning process is labor intensive since skin can be applied or touched up manually.

In the aforementioned commonly owned and assigned copending patent application U.S. patent application Ser. No. 13/463,125, an automated or robotic axial skinning apparatus and method is disclosed. The part to be skinned can optionally be first contoured or shaped, and then inserted into a tube (aka: "unipipe") or skinning chamber having a diameter that is slightly larger than the part. The annular cavity (i.e., annulus) between the part and the tube is filled with flowable skinning cement and then the part, by relative motion, is 'pushed' or urged in the axial direction through the skinning chamber. As the part emerges from the other end of the skinning chamber, the part ideally has a uniform amount of cement on its surface (skin). The wet skin can then be dried to obtain a functional skin.

In the axial skinning process, it has been observed that there is a preferred window of applied pressure (P) and pressure drop ($\Delta P$), which can be realized to obtain high quality skin results on the surface of the skinned parts. Goodness of the skin includes a skin that is smooth and highly uniform and free of defects such as 'ripples' or 'pock' marks.

In embodiments, the present disclosure demonstrates that there is an upper limit to the applied pressure on the flowable cement before skin defects begin to appear, and provides a method for predicting that pressure limit by calculation. When the apparatus and process are operated above the pressure limit the skin on the resulting skinned parts can exhibit, for example, 'ripple' defects.

In embodiments, the disclosure defines a preferred operating window for the axial skinning apparatus and skinning process. A clearly defined operating window provides consistent apparatus operation and improves or maintains the quality of the skin on a skinned part by smoothing the skin as much as possible. When the apparatus and process are operated at conditions described herein, the following advantages can be realized, for example:

high quality skinned part having high smoothness (ripple free or at least reduced ripples; parts with ripples can be rejected by customers for aesthetic or functional reasons);

maximization of process productivity;

minimization of waste cement; and a maximum operating pressure for the flowable cement in the skinning apparatus.

The pressure on the flowable skinning cement can be, for example, from about 1 to about 10 psi. Continued development of the apparatus and method of using the apparatus has revealed useful relations among: the pressure applied to the flowable skinning cement; the velocity of the parts traversing the skinning chamber; the size of annular gap; and the rheology of the flowable skinning cement.

In embodiments, the present disclosure provides a superior process for operating the skinning apparatus. The present process defines a dimensionless pressure parameter called lambda ($\Lambda$) given by equation (1):

$$\Lambda = \frac{(\Delta P)R}{2mL}\left(\frac{R}{V}\right)^n \quad (1)$$

where $\Delta P$ is the pressure drop in the initial manifold pressure (P) applied to the flowable cement, R is the radius of the axial skinning region of the unipipe, V is the velocity of the part traversing the axial skinning region of the unipipe, L is the axial length of the unipipe in the skinning region of the unipipe, and m and n characterize the fluid rheology of the flowable cement, specifically, in a log-log plot of viscosity versus shear rate, n is the slope, and m is an actual value in the line equation y=mx$^n$.

It has been discovered that the Lambda parameter has a limit, or "do not exceed" value, and which limit depends only on the dimensions of the annulus gap and the fluid rheology of the flowable cement. The annulus dimension (k) or gap is the space between the axial skinning pipe and the part within the pipe.

In embodiments, the disclosure provides a process for operating an axial skinning apparatus for continuous manufacture of skinned ceramic honeycomb parts, comprising:
  determining the physical process parameters of the apparatus including:
    the rheology of the flowable skin cement;
    the geometry of the part to be skinned; and
    the geometry of the annulus gap (i.e., the gap or space between the wall of the unipipe and the part) of the skinning chamber; and
  calculating a plurality of dimensionless pressure values (Lambda ($\Lambda$)) according to the formula (1):

$$\Lambda = \frac{(\Delta P)R}{2mL}\left(\frac{R}{V}\right)^n \quad (1)$$

where
  $\Delta P$ is the pressure drop in the initial applied manifold pressure (P) on the flowable skin cement,
  P is the initial applied manifold pressure (i.e., the external pressure source exerted on the flowable cement in the apparatus),
  R is the radius of the skinning chamber in the skinning region (R1) (i.e., the interior of the axial skinning unipipe),
  V is the velocity of a part traversing the skinning chamber,
  L is the axial length of the skinning chamber (i.e., the unipipe), and
  m and n characterize the fluid rheology of the flowable skin cement according to the relation y equals m times x$^n$ (that is, of the formula y=mx$^n$);
plotting a plurality of manifold pressures (P) versus a plurality of part velocities (V); and
selecting at least one operating window based on the skin quality of a plurality of preliminarily skinned parts.

In embodiments, the disclosure provides a process for determining an operating window for an axial skinner.

In embodiments, the dimensionless pressure value, lambda ($\Lambda$), depends only on the dimensions of the annulus gap and the fluid rheology of the flowable skin cement.

In embodiments, the geometry of the annulus gap can be, for example, a pair of concentric cylinders having a circular or oval cross-section.

In embodiments, the rheology of the flowable skinning cement can be characterized by, for example, the m and n values obtained from a log-log plot of viscosity versus shear rate for a plurality of preliminarily skinned parts, where m is the slope, and n is an exponential value in the expression y equals m times x$^n$ (i.e., y=mx$^n$).

In embodiments, the average value of the plurality of dimensionless pressures, lambda ($\Lambda$), can be, for example, from about 10 to about 150.

In embodiments, the critical pressure drop Lambda ($\Lambda_{cr}$) can be, for example, from 150 to 200.

In embodiments, in an operating axial skinning apparatus of the disclosure, if the Lambda ($\Lambda_{cr}$) is maintained at less than 150, then the process prevents or reduces skin ripple defects in the skinned parts.

In embodiments, the skin quality of a plurality of skinned parts can include at least one of the following quality metrics:
  an absence of bare spots (i.e., skinless surface areas on a part);
  absence of skin ripples (i.e., ripples, ridges, wrinkles, creases, or like defects on the skinned surface of a part); and
  a dry skin thickness from 0.5 to 1.5 millimeters, preferably from 0.7 mm to 1.2 mm, and more preferably from 0.75 to 1.2 millimeters, and having a nominal skin thickness of, for example, about 1 millimeter, including intermediate values and ranges.

For a 300 cells per square inch (cpsi) part the cell length is (1/sqrt(300)) inches or equal to 0.0578 inch or 1.466 mm. If one subtracts the cell wall widths (e.g., 10 mils) one gets an open channel width of 1.21 mm. The cells, with the exception of peripheral or partial cells, are not encumbered within cement.

In embodiments, operating the axial skinning apparatus, i.e., within an operating window, can preferably be accomplished as close to the maximum critical lambda value ($\Lambda_{cr}$) but without exceeding it.

Figure 1:
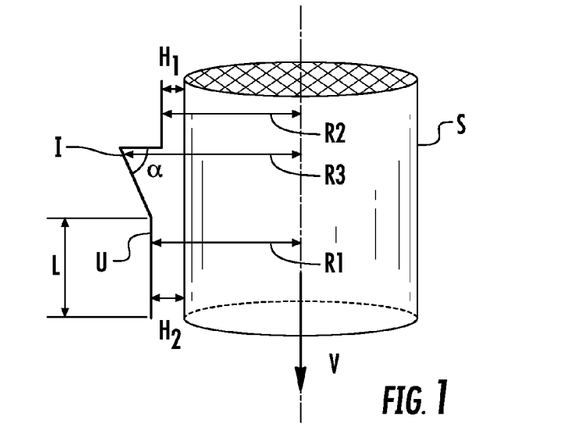
FIG. 1 shows a partial schematic of the disclosed apparatus and process where the substrate (S) moves through a unipipe (U) having differential radii (R1, R2, and R3; where R3 is greater than R1, and R1 is greater than R2), with a given velocity (V).

Referring to the Figures, FIG. 1 shows a partial schematic of the disclosed apparatus and process where the substrate (S) moves through a unipipe (U) having differential radii (R1, R2, and R3; where R3 is greater than R1, and R1 is greater than R2) with a given velocity (V). Flowable skin cement (not shown) is introduced into the unipipe skinning chamber at the inlet (I), where alpha ($\alpha$) is the angle of the cement introduction area. The annulus gap has a pre-skin region having a dimension (H1) and a skin region having a larger dimension (H2). As the part comes out of the chamber, it carries the skin cement on the part's axial exterior surface. On drying the applied surface cement becomes the "skin" having a thickness that approximates the dimension of the annulus gap (H2). The analysis presented below is primarily directed to the radial skin section (H2) and dimension R1.

FIG. 1 shows a schematic of the disclosed process. A cylindrical substrate can be, for example, pushed through a first cylindrical region (section R2). The space in between the part (e.g., filter substrate) and the tailpipe portion, i.e., the annulus gap (section R3), can be filled with flowable skin cement to coat the part. The flowable cement can be introduced to this section from outside through a suitable inlet (I) such as a manifold. The cement can be introduced to this geometry with a certain manifold pressure ($P_M$).

The skin thickness on the skinned part can depend on how much skin cement associates with the part as the part exits the skinning chamber. The skin thickness is a function of, for example, the cement rheology, the apparatus and part geometries (gap sizes, radius and length of the tailpipe, and cell geometry of the part), the relative velocity of the part with respect to the skinning apparatus, and the pressure applied to the cement at the inlet.

The rheology of the flowable skin cement can be described in terms of a power law behavior (also known as the Ostwald-de Waele power law fluid) and is discussed below. A dimensionless pressure parameter ($\Lambda$), as defined herein, governs the behavior of the cement flow. In accordance with the present disclosure one can calculate the critical value of Lambda ($\Lambda_{cr}$) at which the flow field transitions from being part velocity dominated to pressure dominated.

It is also a significant aspect for the operational stability of the disclosed process to operate under conditions such that the critical value of $\Lambda$ ($\Lambda_{cr}$) is not exceeded.

It is also a significant aspect to note that the substrates can have a "ridged" or stair-step profile on portions of the exterior wall of the part prior to applying any skin. The stair step pattern can inherently give rise to a varying gap size. The cement flow rate (and the skin thickness) can be a sensitive function of the annulus gap dimension. The extent of the stair step pattern can be a significant obstacle in achieving uniform skin thickness and smooth finish properties. To calculate the critical value of $\Lambda$ ($\Lambda_{cr}$) one can use the maximum possible gap size between the substrate and the wall of the skinning chamber to arrive at conservative critical value.

Description of the Rheology of the Flowable Cement

Figure 6:
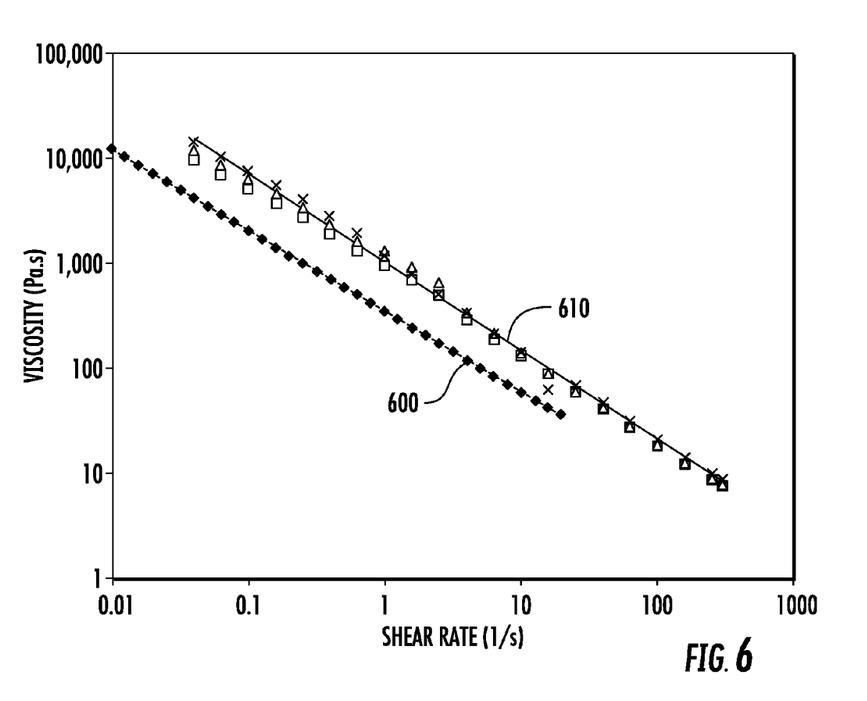
FIG. 6 shows the rheological data demonstrating the power law dependence of the viscosity (y-axis) on the shear rate (x) (x-axis in a log-log plot) for four samples (squares, triangles, "X", and diamonds).

FIG. 6 shows the viscosity of the skin cement as a function of the shear rate can be expressed as a power law. The relation between stress and shear rate can be written (in cylindrical coordinates) as:

$$\tau_{rz} = -m \left| \frac{dv}{dr} \right|^{n-1} \frac{dv}{dr}$$

where, $\tau_{rz}$ is the shear stress, $V_z$ is the velocity in the z-direction and is a function of radial position (r), and m and n are two rheological constants called the consistency factor and the power law index, respectively. Their values can be obtained by fitting the experimental data. For one skin cement that used: m was equal to 355.15, and n was equal to 0.228. This skin cement composition was a blend of coarse (70 wt %) and fine (30 wt %) silica particles, wollastanite fibers (10 wt %), a methocel binder (1.1 wt %), and added liquid including Ludox and water. A value of n less than 1 means that the fluid is shear thinning.

FIG. 6 shows the rheological data demonstrating the power law dependence of the viscosity (y-axis) on the shear rate (x) (x-axis in a log-log plot) for four samples (squares, triangles, "X", and diamonds). A least squares fit line (610) shows power law dependence and closely approximates the squares, triangles, and "X" data points. The specific parameters obtained were: n is equal to 1−0.844 or 0.156, m is equal to 1029.6, and $R^2$ fit is equal to 0.9961. Also shown is least squares fit line (600) having power law dependence that closely approximates the diamond data points. The specific parameters for the diamonds were: n is equal to 1−0.772 or 0.228, m is equal to 355.15, and the $R^2$ fit is equal to 0.9998. For the triangles: n=0.156, m=1029; for the "X": n=0.140, m=1092.2; and for the squares: n=0.179, m=865.13.

The Flow Model

The flow equation can be written in cylindrical coordinate as:

$$\Lambda = \frac{(\Delta P) R}{2mL} \left( \frac{R}{V} \right)^n = \text{dimensionless pressure gradient}$$

where
the z-direction is the flow direction,
R is the radius of the skinning chamber;
L is the length of the skinning chamber;

$\kappa$ is the dimensionless gap (and k or H2 is the gap dimension in the skinning region defined below);
$\kappa$R is the radius of the substrate; so $\kappa$ is always less than 1;
V is the velocity of the part or substrate traversing the skinning chamber; and
$\Delta P$ is the pressure drop in the tailpipe section.

The flow equation can be written as:

$$\frac{\partial (r \tau_{rz})}{\partial r} = \frac{\Delta P}{L} r$$

Using Mallik's formulation (see Mallik, et al., "Generalized annular Couette flow of a power-law fluid." *Industrial & Engineering Chemistry Research*, 30.8 (1991): 1950-1954), the above equation (1) can be integrated to give equation (2):

$$\tau_{rz} = \left( \frac{\Delta P R}{2L} \right) \left( \xi - \frac{\lambda^2}{\xi} \right) \quad (2)$$

Using equations (1) and (2), the problem can be rewritten as equation (3):

$$\left| \frac{d\phi}{d\xi} \right|^{n-1} \frac{d\phi}{d\xi} = \Lambda \left( \frac{\lambda^2}{\xi} - \xi \right) \quad (3)$$

where
$\phi = v_z/V$ is the dimensionless velocity in the z-direction,
V is the velocity of the part,
$\xi = r/R$ is a dimensionless radial axis, and
$\lambda$ is a constant of integration.

Rewritten equation (3) includes the dimensionless parameter Lambda ($\Lambda$). Lambda ($\Lambda$) can be viewed as a dimensionless pressure gradient. Lambda ($\Lambda$) is positive when the pressure gradient and the velocity are in the same direction. Lambda ($\Lambda$) is negative when the pressure gradient and the velocity oppose each other.

Equation (3) can be solved, with no-slip boundary conditions at the tailpipe and the substrate. In the tailpipe section, the applied pressure (P) on the cement and the velocity (V) of the substrate are in the same direction.

Figure 2:
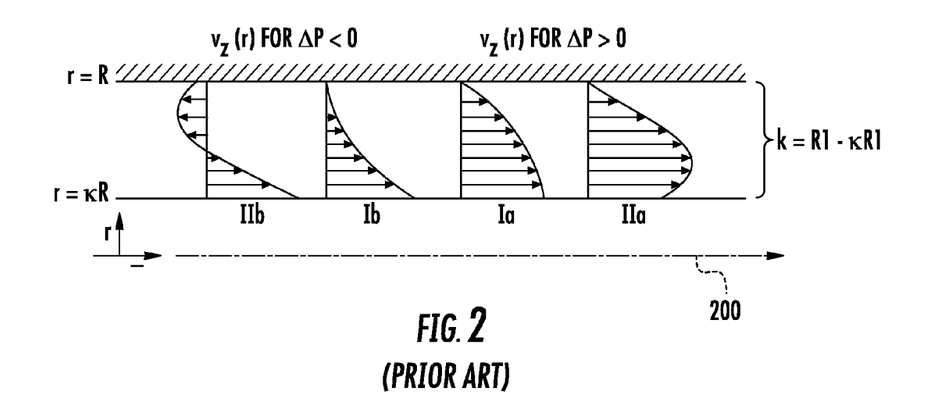
FIG. 2 shows various possible prior art velocity distributions or velocity profiles within the annular region when the cement flow is driven by both the moving wall of a part or substrate, and the applied pressure drop ($\Delta P$).

FIG. 2 shows various possible prior art velocity distributions or velocity profiles within the annular region when the cement flow is driven by both the moving wall (i.e., the part traversing the spatially fixed skinning region, or the skinning region traversing the spatially fixed part), and the applied pressure drop (see Mallik, et al., supra.). The x-axis (200) represents the velocity distributions. Situations IIb and Ib illustrate the result when, for example, the pressure drop opposes the velocity of the moving wall of the part. These situations are observed in the pre-skin section of the skinning chamber. Situations Ia and IIa illustrate the result when, for example, both the pressure drop and the velocity of the moving wall of the part are in the same direction. Situations Ia and IIa are valid for the skinning section of the skinning chamber (also known as the unipipe). In FIG. 2, kappa ($\kappa$) is the dimensionless annulus gap, r=$\kappa$R is the dimensionless radius of the part being skinned, and r is the radius of the tailpipe. In real terms kappa ($\kappa$) can be equated to an actual gap dimension (k) or R1 in FIG. 1 according to the formula:

$$k = R1 - \kappa R1.$$

FIG. 2 shows that the flow profile will either belong to situation Ia or situation IIa. Operating in regime Ia is preferred for obtaining preferred skinning results.

In situation IIa, the net outflow could be such that the skin thickness is actually larger than the gap width (due to mass balance). An aspect of the present disclosure is to avoid putting excessive skin on the parts. If an operator (for example, a human or programmable control system) determines that the skinning apparatus is operating in the regime of situation IIa, then the operator can afford to increase the speed of the substrate and move into the preferred regime of situation Ia. Operating regime of situation Ia can produce an increase in skinning efficiency and greater productivity.

The cement flow rate can be highly sensitive to the operating pressure (and gap dimension) when one operates in the regime of situation IIa compared to the regime of situation Ia. In regime IIa, a slight increase in pressure (or gap dimension) can lead to large changes in the cement flow rate. This alone, in theory, should not be an issue. But the gap dimension typically can be non-uniform because of the stair step (i.e., "ridged" or "saw tooth") on the axial side wall or outer surface of the part, and the sensitivity of flow rate to the gap dimension translates to a disproportionately large flow rate in the regions having a wider gap dimension. The large flow rate can lead to the 'ripple' effect or skin defect observed in preliminary skinning experiments.

In embodiments, preferred operating conditions can be selected in regime Ia where there is no maxima in the velocity profile.

The sensitivity of the cement flow rate (Q) to the gap dimension in the two regimes (Ia and IIa) is:

For substrate velocity (V) dominated flow:

$$Q \propto (1-k)^2 R^2 \quad (4)$$

For a pressure drop (ΔP) dominated flow:

$$Q \propto \left(\frac{\Delta P}{2mL}\right)^{1/n} [(1-k)R]^{2+1/n} \quad (5)$$

In the pressure drop dominated situation of equation (5), the flow rate (Q) is highly sensitive to the applied pressure (P) and the gap size (k). Because of the sensitivity of the flow rate to various processing parameters in the pressure drop dominated situation one needs to avoid this regime during the operation of the axial skinner. However, when the flow is driven by both the velocity and the pressure, the scaling will be in-between the two extremes.

Mallik (supra.) showed that there is a critical value of Lambda ($\Lambda_{cr}$) beyond which there is a maxima in the velocity profile (situation IIa). This critical value can be calculated according to equation (6):

$$\Lambda_{cr} = \left\{ \int_k^1 \left( \xi - \frac{k^2}{\xi} \right)^{1/n} d\xi \right\}^{-n} \quad (6)$$

where $\xi = r/R$ is a dimensionless radial axis.

Figure 5:
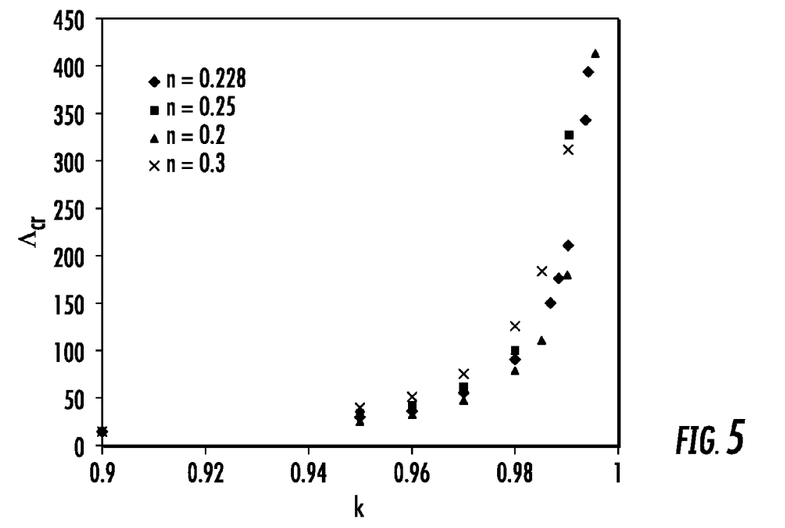
FIG. 5 shows critical values of lambda ($\Lambda_{cr}$) as a function of the annulus gap dimension (k) for different values of n.

FIG. 5 shows the variation of $\Lambda_{cr}$ with the gap size (k) for various values of n varying between 2 and 3. As the gap size (k) is increased, $\Lambda_{cr}$ also increases. The gap size (k) also increases with n.

A higher value of $\Lambda_{cr}$, all other parameters being constant, implies that an operator can apply higher pressure before there is a cross over from regime Ia to regime IIa. For a given substrate geometry and substrate velocity, one can then calculate critical pressure drop ($\Lambda_{cr}$) (in psi) beyond which the transition to regime IIa occurs.

Figure 4:
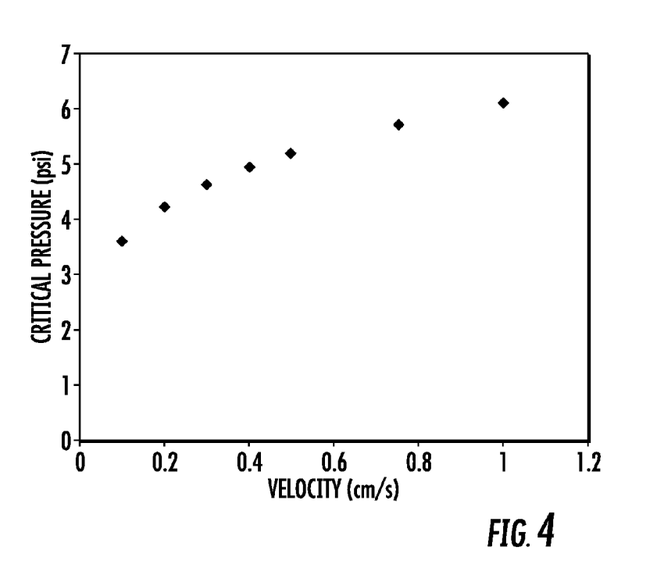
FIG. 4 is a chart that shows critical pressure ($P_{cr}$) as a function of velocity (V) of the substrate for selected values.

FIG. 4 is a chart that shows critical pressure ($P_{cr}$) as a function of velocity (V) of the substrate for k equal to 0.9868, the tailpipe section (L) is equal to 3.8 cm, R is equal to 6.35 cm, n is equal to 0.228, and m is equal to 355.15. The critical value of the pressure drop is shown for the indicated parameter set as a function of substrate velocity. For selected parameters, an operator preferably operates as close to the critical pressure drop ($\Lambda_{cr}$) but without exceeding the critical pressure drop.

Figure 3:
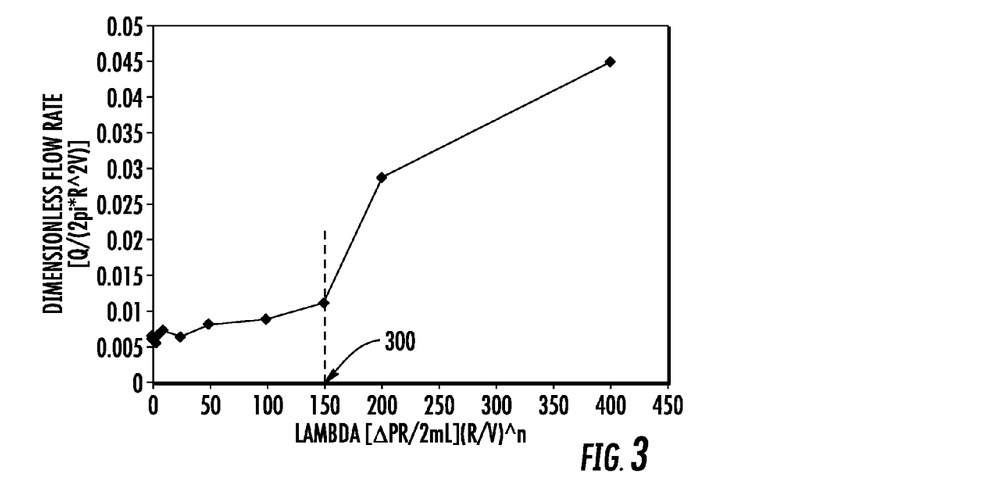
FIG. 3 is a chart that shows the dependence of a dimensionless flow rate on a dimensionless pressure drop (Lambda).

In FIG. 3, the dimensionless flow rate (Q) is shown as a function of Lambda (Λ). For the selected parameters, $\Lambda_{cr}$ is about 149.9 (300). As shown in FIG. 3, the flow rate depends relatively weakly on the Λ below the critical value and then increases sharply as the critical value is crossed. FIG. 3 shows the dependence of a dimensionless flow rate on a dimensionless pressure drop (Lambda). Note that beyond a critical or limit value of Lambda of about 150 (dotted line; 300), the flow rate increases sharply with the applied pressure drop. Here the value of the annulus gap dimension kappa (k) used was 0.9868, and n was equal to 0.228.

Skinning experiments were conducted in laboratory scale axial skinner equipment using two inch (2") diameter parts. The intent of the experiments was to define a preferred window of operation of the process, which operation would result in defect free skin on parts. Additionally, another intent of the experiment was to determine the maximum and minimum pressure set points, if any, beyond which the process is no longer defect free.

Figure 7A:
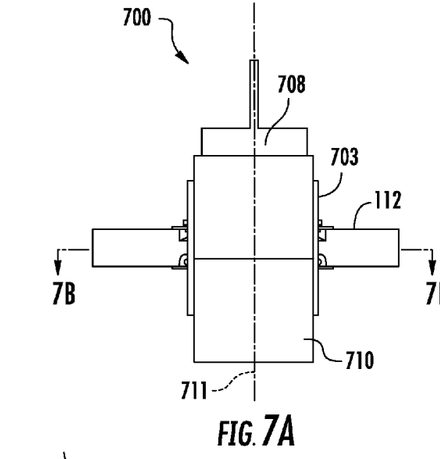
FIGS. 7A and 7B show orthogonal cross section views of the skinner apparatus (700) used in the experiments.
Figure 7B:
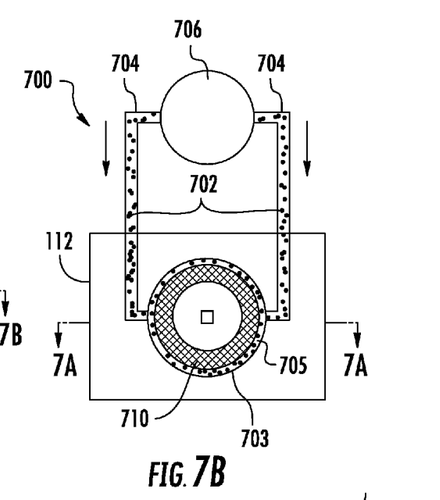

FIGS. 7A and 7B show orthogonal cross section views of the skinner apparatus (700) used in the experiments. The flowable skin cement (702) is fed into the cylindrical tube (703)(also known as the unipipe) through pipe(s) (704) from a pressure tank (706) maintained at a determined pressure set point. A pusher (708) is used to push or advance the parts (710) through the fixed unipipe. Alternatively, a pusher (708) can be adapted to push or advance a movable unipipe and manifold (112) past positionally fixed parts (710). Another alternative can simultaneously move the parts and unipipe and manifold (112) in opposite directions to accomplish the skinning. The pusher can be electrically actuated. The manifold (112) supports the unipipe, and uniformly distributes the flowable skin cement around the unipipe to ensure a uniform flow front to the part in the annulus (705) or gap.

The skin batch material is fed into the manifold through a pressure pot using pipes. The pressure in the tank can be set to different values. The part is moved through the cylindrical tube or skinning chamber (also known as the unipipe) by the pusher and the part velocity can also be set to different or desired values. The unipipe can serve two purposes: to transiently hold the part while skinning; and to ensure uniform flow around the part for even coverage of the skin cement on the part. In this experiment, various combinations of the tank pressure and part velocity were run to determine the preferred process window of operation.

Figure 8:
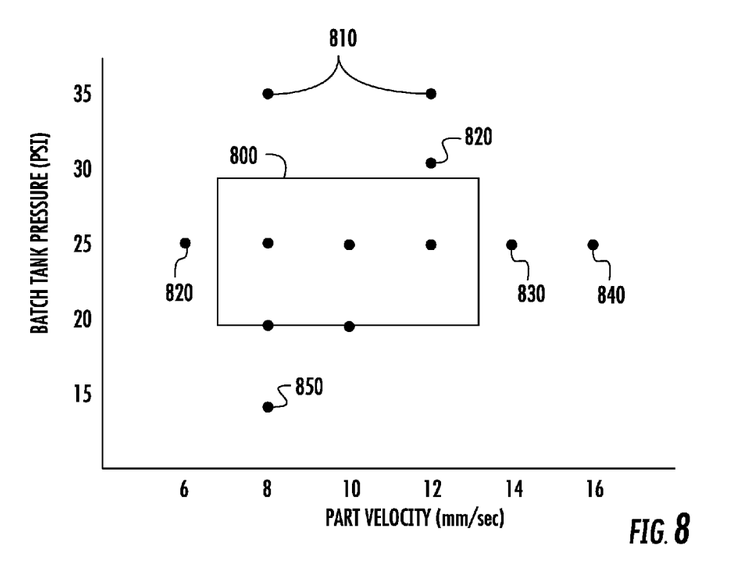
FIG. 8 shows a summary of the part skinning experiments based on tank pressure ($P_T$) and part velocity (V) that revealed a preferred operating process window.

FIG. 8 shows a summary of the part skinning experiments based on tank pressure ($P_T$) and part velocity (V) that revealed a preferred operating process window. The x-axis shows different part velocities that were used and the y-axis shows the batch tank pressures (psi). Based on these experiments, it was determined that the preferred operating process window (800) with respect to the batch tank pressure was from 20 to 27 psi, and the part skinning velocity was from 7 mm/sec to 13 mm/sec. Selected skin quality results, and metrics defined herein, are indicated by points on the chart as: fast flow (810); slight evidence of fast flow condition (820); some starving condition (830); starving condition (840); and no skin observed on greater than about 80% of the part condition (850). Within window (800) the skin quality obtained was reasonably good enough for the parts to be shipped to customers. Any operating condition beyond these values resulted in defect conditions such as fast flow conditions (defined as a condition in which preferential flow could be seen which results in thicker skin in certain sections of the part) and starving conditions (defined as a condition in which there is only partial coverage of the part's axial surface with skin).

Figure 9:
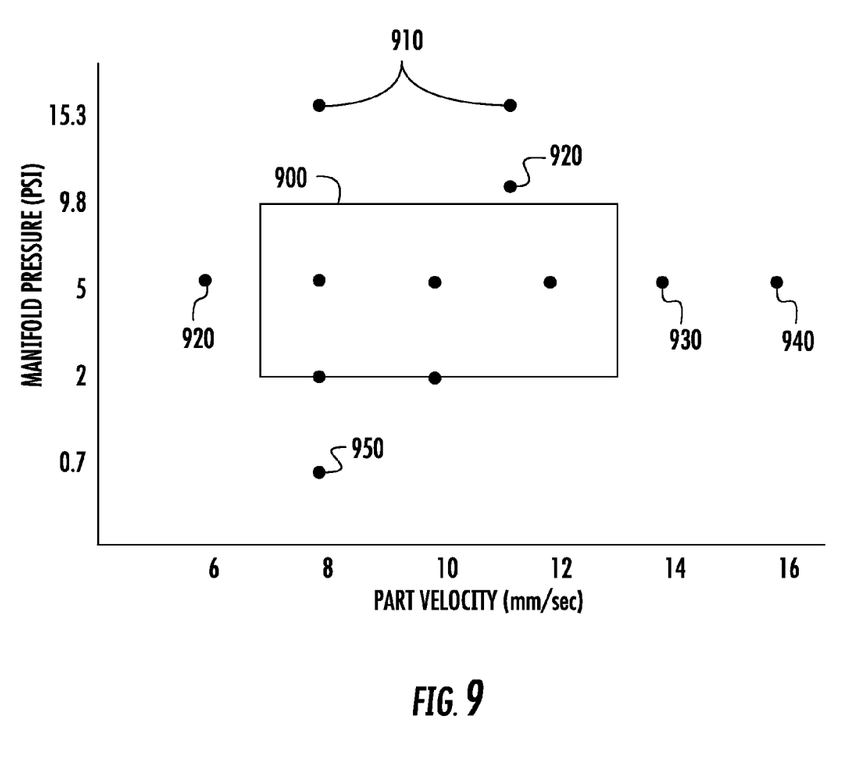
FIG. 9, similar to FIG. 8, is a chart that summarizes part skinning experiments based on manifold pressure ($P_M$) and part velocity (V) that also revealed a preferred operating process window (900).

FIG. 9, similar to FIG. 8, is a chart that summarizes part skinning experiments based on manifold pressure ($P_M$) and part velocity (V) that also revealed a preferred operating process window (900). The x-axis shows the different part velocities that were used and the y-axis shows the manifold pressures used. Based on these experiments a preferred operating process window was revealed with respect to the manifold pressure of from 2 psi to 9.8 psi and the part velocity was from 7 mm/sec to 13 mm/sec. Selected skin quality results are indicated by points on the chart as: fast flow condition (910); slight evidence of fast flow condition (920); some starving condition (930); starving condition (940); and no skin observed on greater than about 80% of the part condition (950).

FIG. 9 shows substantially the same results, except the y-axis shows the pressure at the apparatus manifold just before the skin comes in contact with the part. Again, it can be concluded that there is a preferred pressure and part velocity operating window that needs to be maintained to obtain a defect free skinned part. As expected the values of the manifold pressure are lower than the values of the batch tank pressure, since there is a pressure drop from the tank to the manifold that can be accounted for in the piping and the manifold design.

As shown above it is highly significant to operate in regime Ia and to have a definite criteria to estimate the critical value ($\Lambda_{cr}$). Referring to FIG. 5, the critical $\Lambda_{cr}$ increases with increasing annulus gap (k). Conversely, $\Lambda_{cr}$ decreases with decreasing gap size. To estimate the smallest value of $\Lambda_{cr}$ one should consider the maximum possible gap (k) size and use that as the criteria. Using the maximum possible gap (k) size one can obtain the most conservative estimate (maximum) for $\Lambda_{cr}$ or the operating pressure (P). FIG. 5 shows critical values of lambda ($\Lambda_{cr}$) as a function of the annulus gap dimension (k) for different values of n. Lambda increases significantly as k approaches 1.

EXAMPLES

The following example(s) serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to accomplish the method of the disclosure.

Example 1

Dependence on Skin Cement Rheology (Water Call)

Since $\Lambda_{cr}$ increases with n, a highly shear thinning cement (i.e., lower n values) will have a smaller $\Lambda_{cr}$. In addition, calculation of the critical pressure drop involves m. The higher the value of m, the higher the critical pressure drop. Although it has not been definitively established, it is believed that n and m could both be a function of water call of the cement. It is expected that a higher water call will lead to either a lower value of m, a higher value of n, or both. Higher values of n translate to larger values of $\Lambda_{cr}$, and to higher critical pressure drops. Lower values of m imply a lower critical pressure drop. Thus both the effects oppose each other. Accordingly, it can be difficult to predict without the experimental rheological data for the flowable cement whether higher water will lead to an increase or a decrease in the critical pressure drop.

Example 2

Effect of the Length of the Tailpipe

Changing the length of the tailpipe section (L) does not affect $\Lambda_{cr}$. However, changing the length of the tailpipe section (L) does affect the net critical pressure drop. The longer the L, the required pressure drop will be greater, i.e., the pressure drop will increase linearly with the length.

Example 3

Effect of the Operating Substrate Velocity

Critical pressure drop will increase with the velocity of the substrate, i.e., $\Delta P$ is proportional to Vn, where V is the velocity of the substrate, and n is a constant related to the rheology of the fluid. There is a weak dependence of the pressure drop ($\Delta P$) on the substrate velocity as n is equal to 0.228.

Example 4

Effect of the Radius of the Part ($\Delta P$ is Proportional to $(1/R)^{1+n}$)

Increasing the radius of the tailpipe will lead to a decrease in the critical pressure (assuming that k remains the same). The dependence is slightly stronger than the inverse of radius. The relationship between the critical pressure on various geometrical and rheological properties was outlined above. By modeling the fluid as a power law shear thinning fluid, it was shown that there is a critical value of pressure beyond which the process has a very sensitive dependence on the applied pressure and the gap size. Operating at such large pressures can potentially lead to regions of "fast flows" and lead, in-turn, to ripples in the applied cement skin. For un-skinned parts having a stair-step pattern, the occurrence of fast flow regions at high pressures cannot be entirely avoided by just careful centering of the part. In embodiments, the disclosed process is preferably operated below this critical value. Ideally one would like to operate as close to but below the critical pressure as possible. This way one can maximize the throughput of parts in the process. Table 1 provides typical skinning apparatus and process values for a relatively small lab scale (left two columns) skinning apparatus and a relatively larger pilot scale (right two columns) skinning apparatus. Table 2 provides some prophetic values for the skinning apparatus and the disclosed process.

TABLE 1

Typical apparatus and process values.

| Parameter | Min | Max | Min | Max |
|---|---|---|---|---|
| Radius of the tailpipe (R1) | 2 (inches) | 8 (inches) | 50.8 (mm) | 203.2 (mm) |

TABLE 1-continued

Typical apparatus and process values.

| Parameter | Min | Max | Min | Max |
|---|---|---|---|---|
| Radius of the part (R1-k or R1-H2) | 1.8 (inches) | 7.992 (inches) | 45.72 (mm) | 202.997 (mm) |
| "κ" (kappa; dimensionless gap) | 0.9 | 0.999 | | |
| "k" (dimensioned gap) | 0.002 (inches) | 0.8 (inches) | 0.0508 (mm) | 20.32 (mm) |
| n (dimensionless) | 0.1 | 0.5 | | |
| m | 100 | 2,000 | | |
| Velocity (V) of the part (cm/s) | 0.1 | 1.5 | | |
| Applied pressure (P), (psi) | 1 | 15 | | |
| Tailpipe length (L) (inches) | 0.5 (inches) | 10 (inches) | 12.7 (mm) | 254 (mm) |
| viscosity (Pascal × seconds; Pa · s) | 1 | 100,000 | | |
| Critical pressure drop Lambda ($\Lambda_{cr}$), (dimensionless) | 1 | 5,000 | | |

TABLE 2

Examples (prophetic).

| Critical Lambda ($\Lambda_{cr}$) | P (psi) | V (cm/s) | m | n | R (mm) | k | L (mm) |
|---|---|---|---|---|---|---|---|
| 78.897 | 7.881 | 1 | 351.1 | 0.2 | 101.6 | 0.98 | 100 |
| 55.117 | 3.482 | 1.5 | 355.15 | 0.228 | 127 | 0.97 | 75 |
| 128.342 | 8.784 | 0.5 | 1092 | 0.14 | 151 | 0.99 | 38.1 |

Example 5

Skin Cement Compositions

U.S. Pat. No. 6,551,535 mentions seals (i.e., skin) used in catalytic converters are often made of a paste and is coated onto the exterior lateral surface of the catalyst structure. This seal material must be able to withstand temperatures in excess of 2,000° F. since the catalytic converter will be exposed to such temperatures during operation. It must also be capable of holding the catalyst structure in place within the housing while dampening mechanical vibration between the housing and the catalyst structure. Such a temperature resistant seal may, for instance, be made from a mixture in which an aqueous dispersion of high aspect ratio vermiculite is blended with ceramic fibers to produce a relatively smooth formable blend of vermiculite and fibers. A paste formed of this mixture is applied to the exterior lateral surface of the monolithic catalyst structure so that it encircles the structure while leaving the functional end surfaces uncovered so that exhaust gas can pass through. Examples of mixtures suitable for such seals are disclosed in U.S. Pat. Nos. 5,207,989, and 5,385,873, and in British Patent No. 1,522,646. One example of such a material is a mixture comprising between approximately 28 and 80% dry weight of ceramic fibers capable of withstanding continuous exposure to temperatures in excess of 2,000° F., between approximately 20 and 50 dry weight percent of an aqueous dispersion of high aspect ratio vermiculite and preferably also between approximately 5 and 60% dry weight of low temperature expanded vermiculite.

The abovementioned commonly owned and assigned copending application U.S. Ser. No. 13/302,262, filed Nov. 22, 2011, now US patent publication US20120301664, mentions a honeycomb catalyst support structure comprising a honeycomb body and an outer layer or skin formed of a cement comprising an amorphous glass powder with a multimodal particle size distribution applied to an exterior surface of the honeycomb body. The multimodal particle size distribution is achieved through the use of a first glass powder having a first median particle size and at least a second glass powder having a second median particle size. In some embodiments, the first and second glass powders are the same amorphous glass consisting of fused silica. The cement may further include a fine-grained, sub-micron sized silica in the form of colloidal silica. The cement exhibits a coefficient of thermal expansion less than $15\times10^{-7}/°$ C., and preferably about $5\times10^{-7}/°$ C. after drying.

Suitable cement compositions can include inorganic powders and optional inorganic additive components mixed together with a suitable organic, inorganic, or both binder material. The organic binder material can comprise one or more organic materials, such as a cellulose ether, methylcellulose, ethylcellulose, polyvinyl alcohol, polyethylene oxide and the like, or in embodiments a gum-like material such as Actigum®, xanthan gum, or latex. Methocel A4 is a suitable organic binder and is a water-soluble methyl cellulose polymer binder available from Dow Chemical. A suitable inorganic binder may comprise colloidal silica or alumina comprising nanometer-scale silica or alumina particles suspended in a suitable liquid, such as water. The inorganic binder material is preferably present in the cement composition in an amount less than about 10% of the total weight of inorganic solids present in the cement, and in embodiments inorganic binders are present in an amount equal to or less than about 5 wt. %, and in embodiments in a range from about 2 wt. % to about 4 wt. % taking into account the fluid portion of the organic binder (wherein the weight contribution of the fluid portion is removed). A suitable colloidal silica binder material is Ludox HS40 produced by W. R. Grace. Typical colloidal binder materials can comprise approximately 40% by weight solid material as a suspension in a deionized water vehicle.

The solids used in skin cement of the present disclosure can include, for example, one or more of the following: coarse silica (−80+105 Mesh), having a percent of silica (C+F) of 70.0%; 63.0% dry; fine silica (−200 Mesh), having a percent of silica (C+F) of 30.0%; 27.0% dry; Wollastonite Ultrafibe, having a percent of silica (C+F) of 10.0%; 9.0% dry; and Methocel A4M; 1.1%; 1.0% dry. The liquids can include, for example, water, Ludox, and a deflocculant (e.g., Darvan 7-N). The amount of the liquids used in the batch can be varied depending upon several considerations.

The disclosure has been described with reference to various specific embodiments and techniques. However, it should be understood that many variations and modifications are possible while remaining within the scope of the disclosure.

What is claimed is:

1. A process for operating an axial skinning apparatus for continuous manufacture of skinned ceramic honeycomb parts, the apparatus comprising: a skinning chamber that receives a source of flowable skin cement and receives a part to be skinned by the cement; and an annulus gap defined by the space between the skinning chamber and the part to be skinned;

the process for operating the axial skinning apparatus comprising:
   determining physical process parameters of the apparatus including:
      a fluid rheology of the flowable skin cement;
      a geometry of the part to be skinned; and
      a geometry of the annulus gap; and
   calculating a plurality of dimensionless pressure values (Lambda ($\Lambda$)) according to the formula (1):

$$\Lambda = \frac{(\Delta P)R}{2mL}\left(\frac{R}{V}\right)^n \quad (1)$$

where
   $\Delta P$ is the pressure drop in the initial applied manifold pressure (P) on the flowable skin cement,
   R is the radius of the skinning chamber,
   V is the velocity of a part traversing the skinning chamber,
   L is the axial length of the skinning chamber, and
   m and n characterize the fluid rheology of the flowable skin cement according to y equals m times $X^n$;
   plotting a plurality of manifold pressures versus a plurality of part velocities to produce a graph having a plurality of line plots;
   skinning a plurality of parts to produce a plurality of preliminarily skinned parts; and
   selecting at least one operating window based on the skin quality of the plurality of preliminarily skinned parts, wherein the plurality of dimensionless pressure values (Lambda ($\Lambda$)) have at least one critical pressure drop Lambda ($\Lambda_{cr}$), wherein the selected at least one operating window comprises the at least one point that corresponds to at least one critical pressure drop Lambda; and
   maintaining operation of the axial skinning apparatus at a pressure value less than the at least one critical pressure drop Lambda ($\Lambda_{cr}$).

2. The process of claim 1 wherein lambda ($\Lambda$) depends only on the annulus gap and the fluid rheology of the flowable skin cement.

3. The process of claim 1 wherein the geometry of the annulus gap is a pair of concentric cylinders having a circular or oval cross-section.

4. The process of claim 1 wherein the rheology of the flowable skinning cement is characterized by the m and n values obtained from a log-log plot of viscosity versus shear rate for the plurality of preliminarily skinned parts, where n is the slope, and m represents a shift in at least one of the plurality of line plots given by the equation y equals m times $x^n$.

5. The process of claim 1 wherein the value of the plurality of lambdas ($\Lambda$) is from about 10 to about 150.

6. The process of claim 1 wherein the at least one critical pressure drop Lambda ($\Lambda_{cr}$) is from 150 to 200.

7. The process of claim 1 wherein, in an operating axial skinning apparatus, if the Lambda ($\Lambda_{cr}$) is maintained at less than 150, then the process prevents or reduces skin ripple defects in the skinned ceramic honeycomb parts.

8. The process of claim 1 wherein the skin quality of the plurality of preliminarily skinned parts comprises at least one of:
   an absence of bare spots;
   absence of skin ripples; and
   a dry skin thickness from 0.5 to 1.5 millimeters.

9. The process of claim 1 wherein operating the axial skinning apparatus is accomplished as close to a maximum of the critical lambda value ($\Lambda_{cr}$) but without exceeding it.

* * * * *